United States Patent [19]
Fry et al.

[11] Patent Number: 6,128,722
[45] Date of Patent: Oct. 3, 2000

[54] DATA PROCESSING SYSTEM HAVING AN APPARATUS FOR EXCEPTION TRACKING DURING OUT-OF-ORDER OPERATION AND METHOD THEREFOR

[75] Inventors: Richard Edmund Fry, Round Rock; Dung Quoc Nguyen; Albert Thomas Williams, both of Austin, all of Tex.

[73] Assignee: International Business Machines Corporation, Armonk, N.Y.

[21] Appl. No.: 09/023,891

[22] Filed: Feb. 13, 1998

[51] Int. Cl.[7] .................................................. G06F 9/38
[52] U.S. Cl. ................................ 712/23; 712/244
[58] Field of Search ...................... 395/800.42; 712/23, 712/216, 244, 42

[56] References Cited

U.S. PATENT DOCUMENTS

| | | | |
|---|---|---|---|
| 5,751,985 | 5/1998 | Shen | 395/394 |
| 5,778,219 | 7/1998 | Amerson | 395/591 |

FOREIGN PATENT DOCUMENTS 7-334364  12/1995  Japan .

*Primary Examiner*—Eric Coleman
*Attorney, Agent, or Firm*—Winstead, Sechrest & Minick, P.C.; Anthony V. S. England

[57] ABSTRACT

An apparatus for integer exception register (XER) renaming and methods of using the same are implemented. In a central processing unit (CPU) having a pipelined architecture, integer instructions that use or update the XER may be executed out-of-order using the XER renaming mechanism. Any instruction that updates the XER has an associated instruction identifier (IID) stored in a register. Subsequent instructions that use data in the XER use the stored IID to determine when the XER data has been updated by the execution of the instruction corresponding to the stored IID. As each instruction that updates XER data is executed, the data is stored in an XER rename buffer. Instructions using XER data then obtain the updated, valid, XER data from the rename buffer. In this way, these instructions can obtain valid XER data prior to completion of the preceding instructions. The XER data is retrieved from the XER rename buffer by indexing into the buffer by using an index derived from the stored IID. Because the updated XER data is available in the rename buffer before the updating instruction completes, out-of-order execution of instructions using or updating XER data is thereby realized.

38 Claims, 7 Drawing Sheets

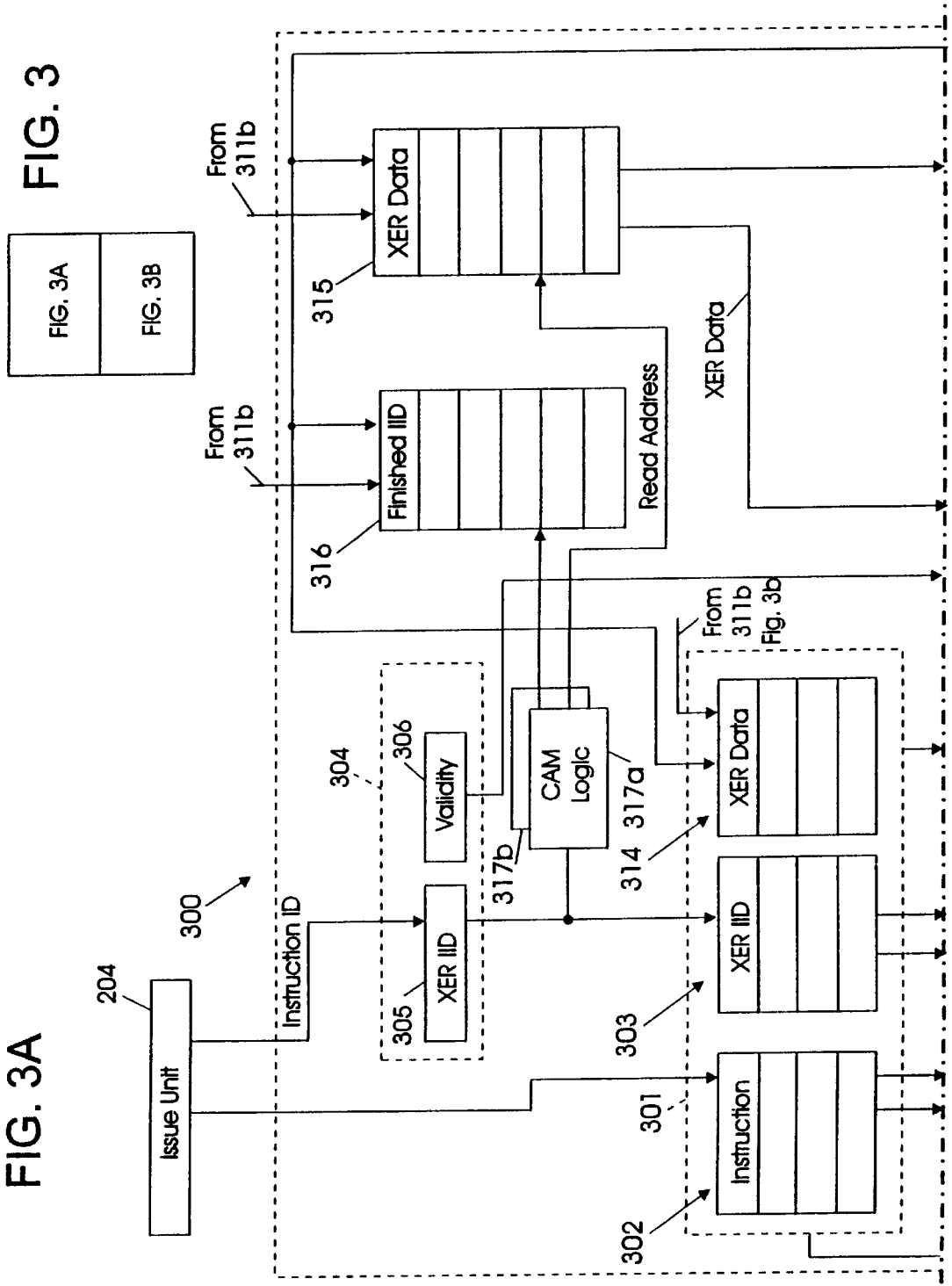

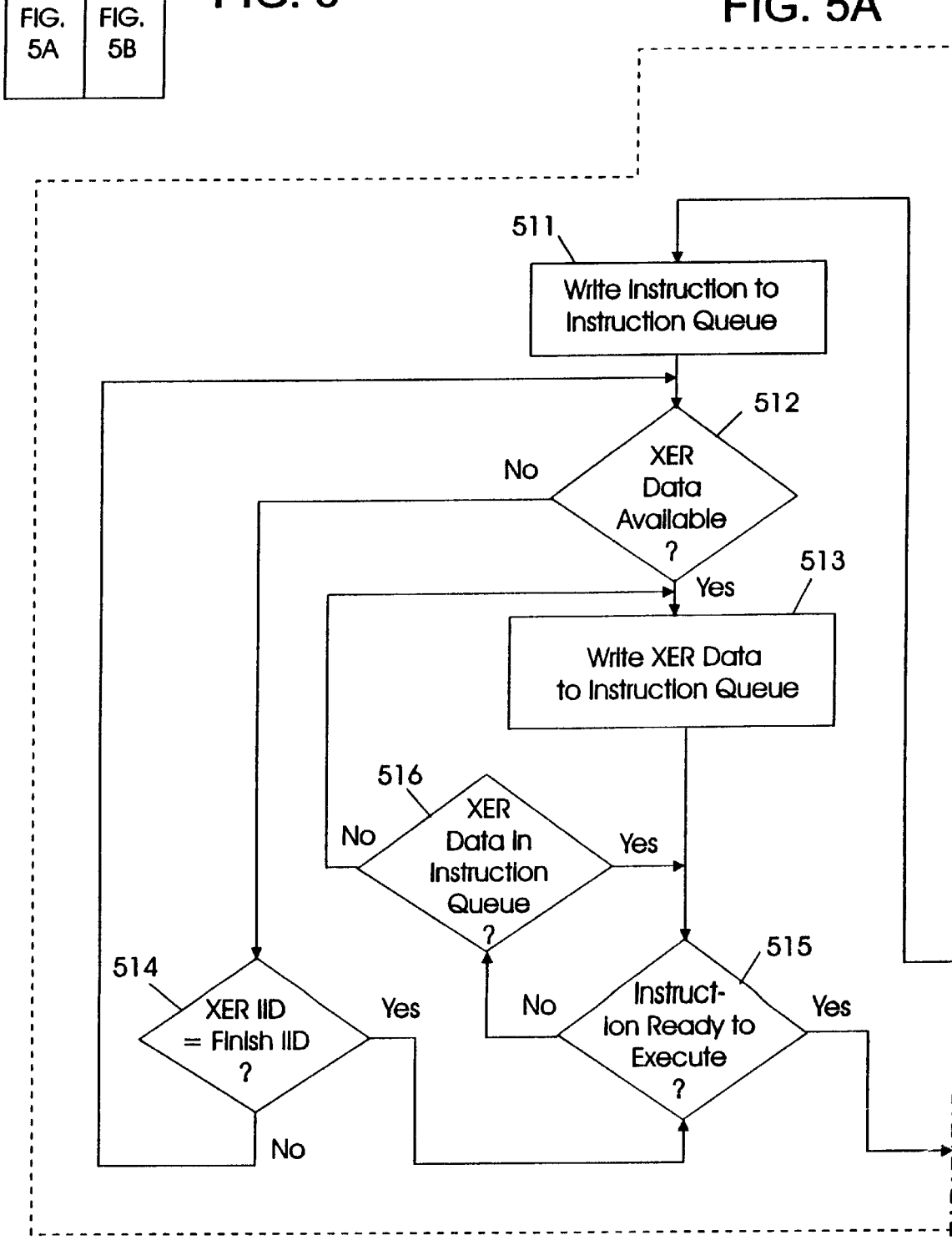

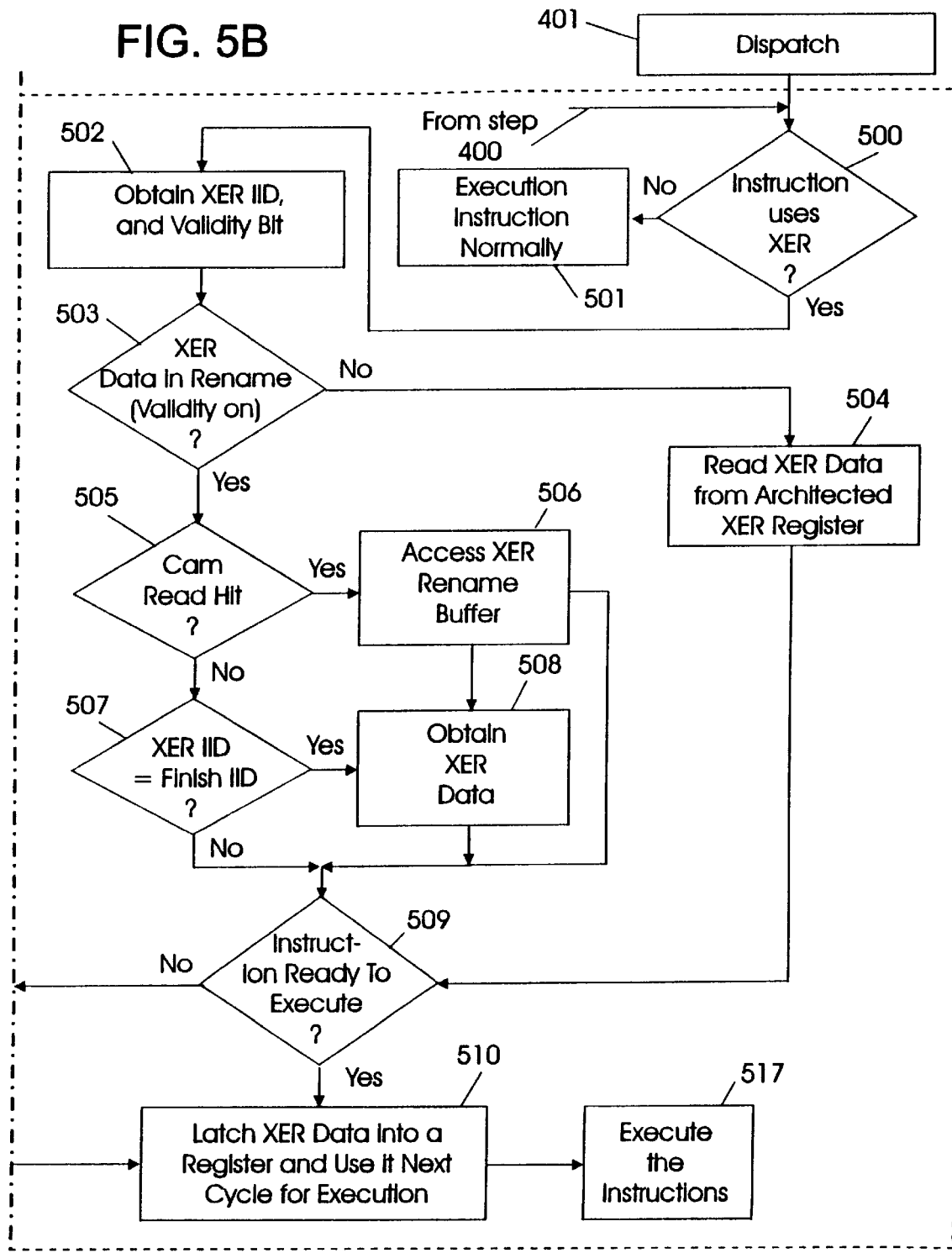

DATA PROCESSING SYSTEM HAVING AN APPARATUS FOR EXCEPTION TRACKING DURING OUT-OF-ORDER OPERATION AND METHOD THEREFOR

CROSS REFERENCE TO RELATED APPLICATIONS

The present invention is related to U.S. patent application Ser. No. 09/024,804 which is hereby incorporated by reference herein.

TECHNICAL FIELD

The present invention relates in general to a data processing system and, in particular, to a data processing system performing out-of-order execution.

BACKGROUND INFORMATION

As computers have been developed to perform a greater number of instructions at greater speeds, many types of architectures have been developed to optimize this process. For example, a reduced instruction set computer (RISC) device uses fewer instructions in greater parallelism in executing those instructions to ensure that computational results will be available more quickly than the results provided by more traditional data processing systems. In addition to providing increasingly parallel execution of instructions, some data processing systems implement out-of-order instruction execution to increase processor performance. Out-of-order instruction execution increases processor performance by dynamically allowing instructions dispatched with no data dependencies to execute before previous instructions in an instruction stream that have unresolved data dependencies. In some data processing systems, instructions are renamed and instruction sequencing tables, also referred to as re-order buffers, facilitate out-of-order execution by re-ordering instruction execution at instruction completion time.

Re-order buffer devices are also used to allow speculative instruction execution. Therefore, data processing systems which support speculative instruction execution can be adapted for out-of-order execution with the addition of relatively minimal hardware. A portion of this added hardware includes logic which is used to determine a time and order that instructions should be issued. Such issue logic can be extremely complex since the dependencies and instructions in a state of a pipeline in which the instructions are being executed must be examined to determine a time at which the instruction should issue. If the issue logic is not properly designed, such issue logic can become a critical path for the data processing system and limit the frequency of instruction execution such that performance gains which could be achieved by out-of-order issue are eliminated.

The out-of-order instruction execution implemented by many prior art systems increases processor performance by dynamically allowing instructions dispatched with no data dependencies to execute before previous instructions in the instruction stream that have unresolved data dependencies. Register file renaming, renaming selected bits of architected facilities, for example registers accessible by software, and instruction sequencing tables (re-order buffers) facilitate out-of-order execution by re-ordering instruction execution at instruction completion time. For more information on such structures, refer to "An Efficient Algorithm for Exploiting Multiple Arithmetic Units," by R. M. Tomasulo, published in *IBM JOURNAL*, January 1967, pp. 25–33. It should be noted that these devices are also used to allow speculative instruction execution. Therefore, system architecture supporting speculative instruction execution can be adapted for out-of-order execution with the addition of relatively "little" hardware and few overhead expenses. Thus, register file renaming may support out-of-order execution without modification from a speculative instruction execution architecture.

However, instructions that alter or use an architected integer exception register (XER) must be executed one at a time in a processor that includes only one such register. In these instances, data dependencies can only be resolved when the updating instruction completes, and the architected register then is valid. Fixed-point instructions that use or alter the contents of the XER are representative of such instructions. The XER contains data values reporting on and conditioning integer instruction execution. Thus, when there is more than one instruction that needs to update or use the XER, then those instructions must be executed in order according to the software program, and can cause bottlenecks in fixed-point operations. The methods discussed above are inadequate and cannot be simply modified to permit out-of-order execution of instructions updating or using the XER. Because the XER includes sticky status data values, conventional rename methods are not useable to implement out-of-order instructions using or updating the XER. Sticky status data are data values that are set by an executing instruction and are retained until reset by software.

Thus, there is a need in the art for a renaming apparatus and method that permits each instruction that needs to update or use the XER to execute out-of-order, thereby increasing instruction execution parallelism and processor performance.

SUMMARY OF THE INVENTION

The previously mentioned needs are addressed by the present invention. Accordingly, there is provided in a first form, a method of increasing instruction execution parallelism in a data processor. The method includes the step of writing an instruction identifier into a first data storage buffer. When an instruction corresponding to the instruction identifier finishes execution, one or more execution condition data values generated thereby are written to a second data storage buffer. In response to a next instruction, the set of execution condition data values is retrieved from the second data storage buffer using the instruction identifier stored in the first data storage buffer.

Additionally, there is provided, in a second form, a data processing apparatus for increasing instruction execution parallelism. The data processing apparatus includes a first data storage buffer containing an instruction identifier. Circuitry for accessing the first data storage buffer is coupled thereto, and to a second data storage buffer containing one or more sets of execution condition data values, each generated in response to an instruction associated with previous ones of the instruction identifier. Circuitry coupled to the second data storage buffer and to the circuitry for accessing the first data storage buffer, retrieves one of the sets of execution condition data values from the second data storage buffer.

Finally, there is provided, in a third form, a data processing system that includes an input circuit for communicating a plurality of instructions. A condition logic circuit generates one or more sets of condition exception values in response to one or more of the plurality of instructions. Rename logic is circuitry coupled to the condition logic circuit, wherein the rename logic circuitry includes a data storage buffer for containing the one or more sets of execution exception values. The data processing system also includes an exception register coupled to the rename logic circuitry wherein the exception register receives one or more sets of execution condition values contained in the first data storage buffer.

These and other features and advantages will be more clearly understood from the following detailed description taken in conjunction with the accompanying drawings. It is important to note that the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3, 3A and 3B illustrate, in block diagram form, an out-of-order XER rename apparatus implemented in accordance with an embodiment of the present invention;

FIGS. 5, 5A and 5B illustrates, in flow chart form, out-of-order XER use in accordance with an embodiment of the present invention.

DETAILED DESCRIPTION

The present invention provides an XER renaming mechanism that supports out-of-order integer unit instruction execution in which there is more than one instruction that needs to update or use the XER. The present invention allows all instructions that need to update or use the XER to execute simultaneously.

Operation of the present invention will subsequently be described in greater detail. Prior to that discussion, however, a description of connectivity of the elements of the present invention will be provided.

In the following description, numerous specific details are set forth, such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessary shown to scale and wherein like or similar elements are designated by the same referenced numeral through the several views.

Figure 1:
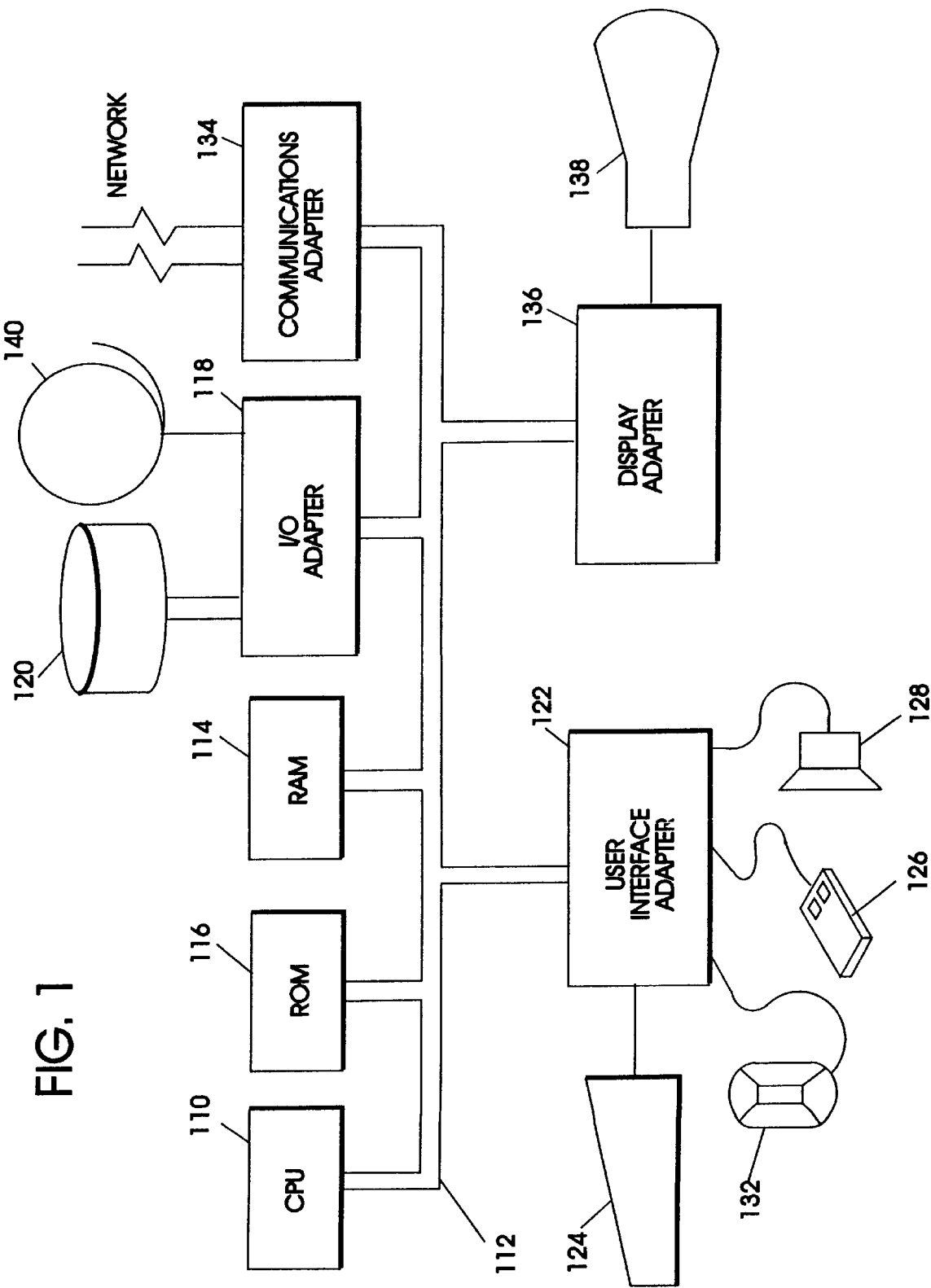
FIG. 1 illustrates, in block diagram form, a data processing system in accordance with one embodiment of the present invention.

Referring first to FIG. 1, an example is shown of a data processing system 100 which may be used for the invention.

The system has a central processing unit (CPU) 110, such as a POWERPC microprocessor ("PowerPC" is a trademark of IBM Corporation) according to "The PowerPC Architecture: A Specification for a New Family of Risk (RISC) Processors", 2d ed., 1994, Cathy May, et al., ed., which is hereby incorporated by reference. A more specific implementation of a PowerPC microprocessor is described in the "PowerPC 604 Risk Microprocessor User's Manual", 1994, IBM Corporation, which is hereby incorporated herein by reference. The XER renaming mechanism of the present invention is included in CPU 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. I/O devices are also connected to system bus 112 via user interface adapter 122 and display adapter 136. Keyboard 124, track ball 132, mouse 126, and speaker 128 are all interconnected to bus 112 via user interface adapter 122. Display monitor 138 is connected to system bus 112 by display adapter 136. In this matter, a user is capable of inputting to the system through the keyboard 124, track ball 132, or mouse 126 and receiving output from the system via speaker 128 and display 138. Additionally, an operating system such as AIX ("AIX" is a trademark of the IBM Corporation) is used to coordinate the functions of the various components shown in FIG. 1.

Note that the invention describes terms such as comparing, validating, selecting, or other terms that could be associated with a human operator. However, for at least a number of the operations described herein which form part of the present invention, no action by a human operator is desirable. The operations described are, in large part, machine operations processing electrical signals to generate other electrical signals.

Figure 2:
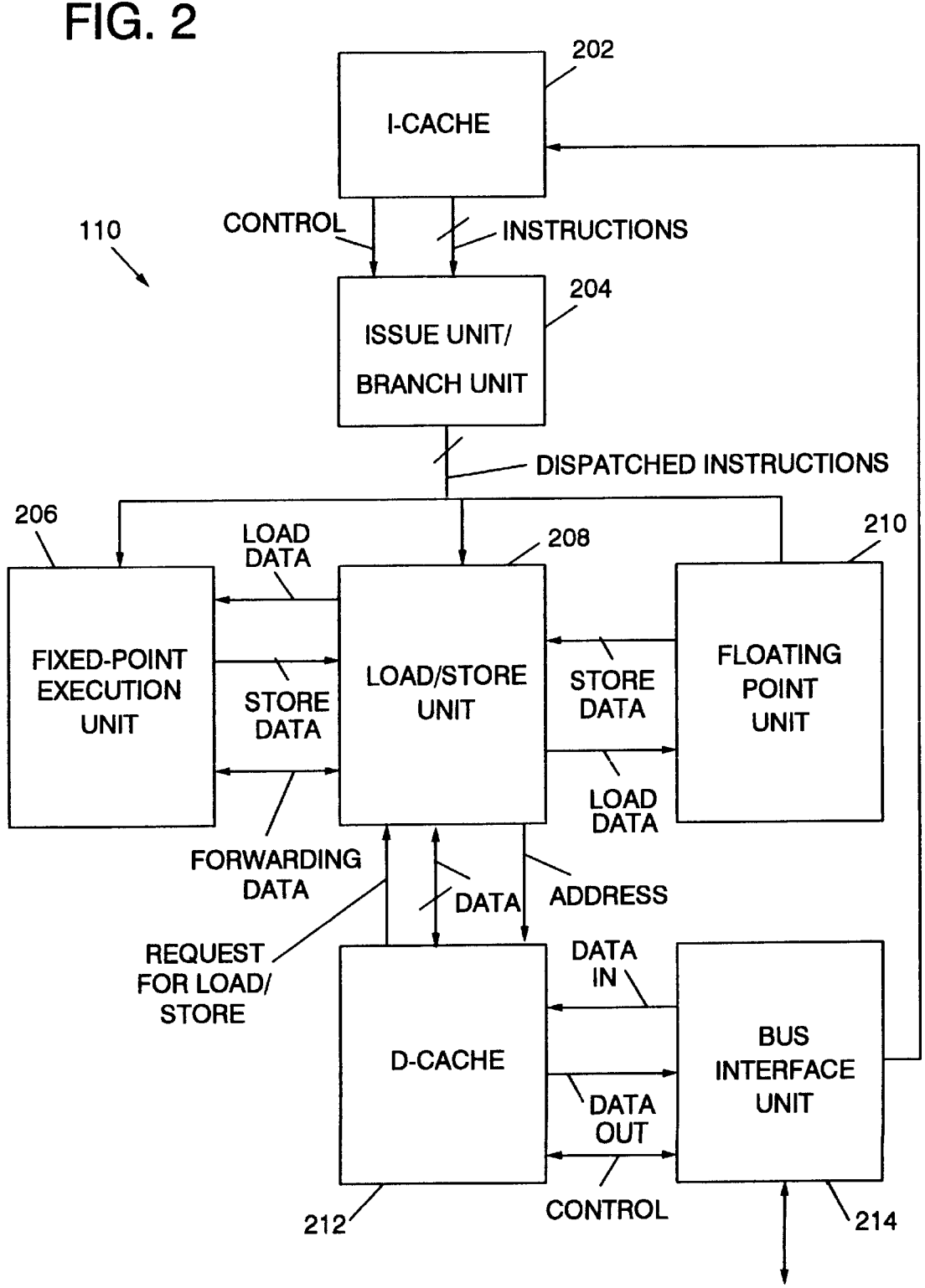
FIG. 2 illustrates, in block diagram form, a central processing unit in accordance with an embodiment of the present invention.

FIG. 2 illustrates a portion of CPU 110 in greater detail. The portion of CPU 110 comprises an instruction cache (I-cache) 202, an instruction unit/branch unit 204, a fixed point execution unit (FXU) 206, a load/store unit 208, a floating point unit (FPU) 210, a data cache (D-cache) 212, and a bus interface unit (BIU) 214, which interfaces with bus 112 in FIG. 1. I-cache 202 is coupled to instruction unit/branch unit 204 to communicate control information in a plurality of instructions. Instruction unit/branch unit 204 is coupled to each of FXU 206, load/store unit 208, and FPU 210 to provide a plurality of dispatched instructions. I-cache 202 is coupled to bus interface unit 214 to communicate data and control information. FXU 206 is coupled to load/store unit 208 to communicate a load data value, a store data value, and a forwarding data value. Load/store unit 208 is coupled to FPU 210 to communicate a store data value and a load data value. Load/store unit 208 is also coupled to D-cache 212 to communicate a request for a load/store signal, a plurality of data values, and an address value. D-cache 212 is coupled to bus interface unit 214 to communicate a data in signal, a data out signal, and a control signal.

Figure 3B:
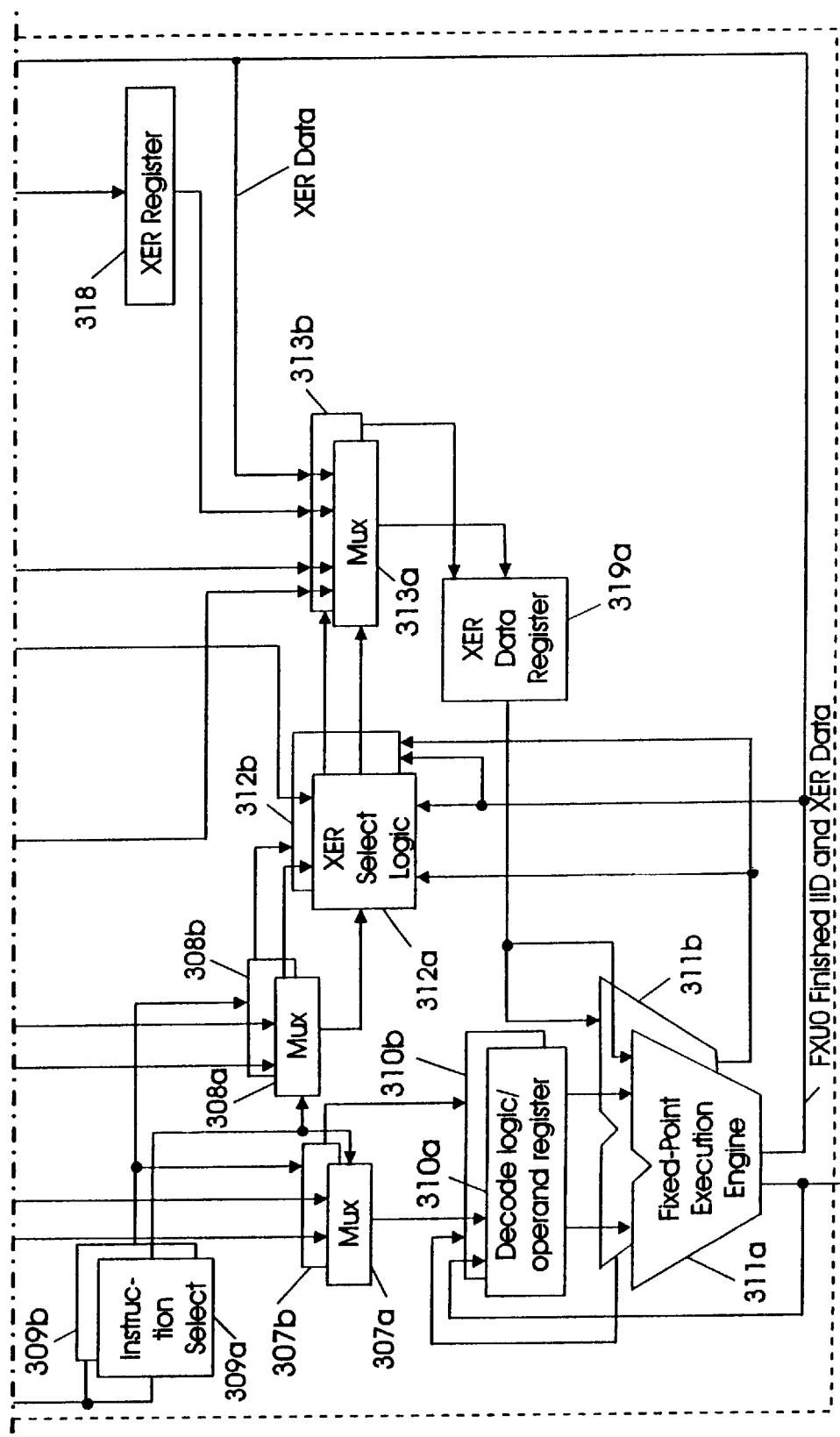

FIG. 3 illustrates an XER rename mechanism 300 according to the principles of the present invention. XER rename mechanism 300 is incorporated in FXU 206. Instructions targeted for FXU 206 are retrieved from I-cache 202 and loaded into instruction queue 301 by issue/branch unit 204. Instruction queue 301 contains a stack of integer instructions to be performed by FXU 206. Instruction queue 301 may be a predetermined value, M, in depth. Each entry in instruction queue 301 contains a portion 302 holding the machine instruction, usually in binary form. Each instruction includes an instruction identification (IID) portion that is assigned by issue unit 204. If the instruction, on executing, updates the XER, its IID is included in another portion of the instruction queue entry, the field IID 303. The IID is also stored in XER status register 304. Within XER status register 304, the IID is stored in the field XER IID 305. If the instruction does not update the XER, XER IID 303 and XER IID 305 contain the IID of the last previous instruction that does update the XER. XER status register 304 also includes a validity field, valid flag 306. Valid flag 306 may be one bit wide. Thus, for simplicity, valid flag 306 may be referred to as validity bit 306. However, it would be understood that in an alternative embodiment, according to the principles of the present invention, valid flag 306 may be a predetermined number of bits, M, wide. This field will be subsequently discussed in further detail.

CPU 110 performs operations in pipeline fashion. Multiple instructions are dispatched from I-cache 202 by issue unit/branch unit 204 to the execution units, such as FXU unit 206. The execution units maintain a pipelined instruction buffer whereby, an instruction is sent to execution as soon as all of its operands are available. Instruction queue 301 is such a pipelined queue. The next instruction for execution is sent to multiplexer (MUX) 307. The XER IID corresponding to that instruction is, at the same time, sent to MUX 308. MUX 307 and MUX 308 also receive instructions and the corresponding IID, respectively, from issue unit 204. If instruction queue 301 is empty, MUX 307 selects the instruction from issue unit 204 and MUX 308 selects the passed-through IID of the last instruction to modify the XER, which may be the passed-through instruction. Instruction select logic 309 controls MUXs 307 and 308.

The instruction selected for execution is passed by MUX 307 to decode logic/operand register 310. Decoded instructions and operands are then sent to fixed-point execution engine 311. Any XER data that the currently executing instruction requires is also sent to fixed-point execution engine 311 from XER data register 319. Integer data output from fixed-point execution engine 311 is sent to load/store unit 208 and is also sent back to decode logic/operand register 310.

The XER data required by the executing instruction may be derived from one of several sources. XER selection logic 312 receives IIDs from MUX 308 and the IID of the finishing instruction from fixed-point execution engine 311. XER selection logic 312 outputs a control signal to MUX 313. The operation of XER select logic 312 and MUX 313 in selecting the XER data to send to fixed-point execution engine 310 subsequently will be described in detail.

MUX 313 receives XER data from several sources. Instruction queue 301 includes a XER data field 314. When an instruction is loaded into instruction queue 301, it receives the XER data from the then-finishing instruction from fixed-point execution engine 311, if this instruction updates the XER. If the currently executing instruction does not update the XER, XER rename buffer 315 is searched for the required XER data. This is effected by a content addressable memory (CAM) read using finished IID buffer 315. Finished IID buffer 316 contains IIDs of finished instructions that have modified XER data values. The CAM read into XER rename buffer 315 is implemented by CAM logic 317.

The queued instruction next ready to execute brings this XER data in XER data 314. MUX 313 also receives XER data from XER rename buffer 315. As each instruction finishes execution, fixed-point execution engine 311 sends the XER data updated by the finishing instruction to XER rename buffer 315. The XER data is also sent to instruction queue 301, where it is received in the field XER data 314. The IID of the corresponding instruction is stored in finished IID buffer 316. The depth of finished IID buffer 316 and XER rename buffer 315 may be the same, and may be a predetermined value, N. The XER data corresponding to a finished instruction and the IID for that instruction are stored in the same relative location in XER rename buffer 315 and finished IID buffer 316, respectively. When an instruction completes, the XER data associated with that instruction is then sent to XER 318. XER register 318 also provides XER data to MUX 313. If the last instruction affecting the XER data required by a pending instruction at the input to MUX 307 has completed, the state of XER register 318 is valid, and may be used by the pending instruction. In response to an output from XER select logic 312, MUX 313 outputs XER data from one of the input sources. Select logic 312 compares finishing IIDs with the XER IID received via MUX 308, to select the XER data source. Select logic 312 effectively allows the next instruction to execute to snoop the output of fixed-point engines 311 in order to resolve its XER data dependencies. In this way, the XER rename mechanism according to the principles of the present invention alleviates the need for the instruction to wait in a queue until valid XER data appears in a rename buffer. Moreover, if XER 318 has valid data, validity bit 306 informs select logic 312 to select that data. This data is latched into XER data register 319 where it is available to the currently executing instruction in fixed-point engine 311.

Issue/branch unit 204 may issue two instructions in each instruction cycle. Thus, FXU 206 may retire two instructions in each cycle, whence two fixed-point engines, 311a and 311b, are included in XER rename mechanism 300. Likewise, MUXs 307a and 308a are duplicated in MUXs 307b and 308b, instruction select logic 309a in instruction logic 309b, decode logic/operand register 310a in decode logic operand register 310b. MUX 313a and MUX 313b receive XER data from both fixed-point engines 311a and 311b. Likewise, XER select logic 312a receives finishing IIDs from fixed-point engine 311a and engine 311b and XER select logic 312b receives finishing IIDs from both fixed-point engine 311a and engine 311b. Similarly, XER rename buffer 315 receives XER data from fixed-point engines 311.

Figure 4:
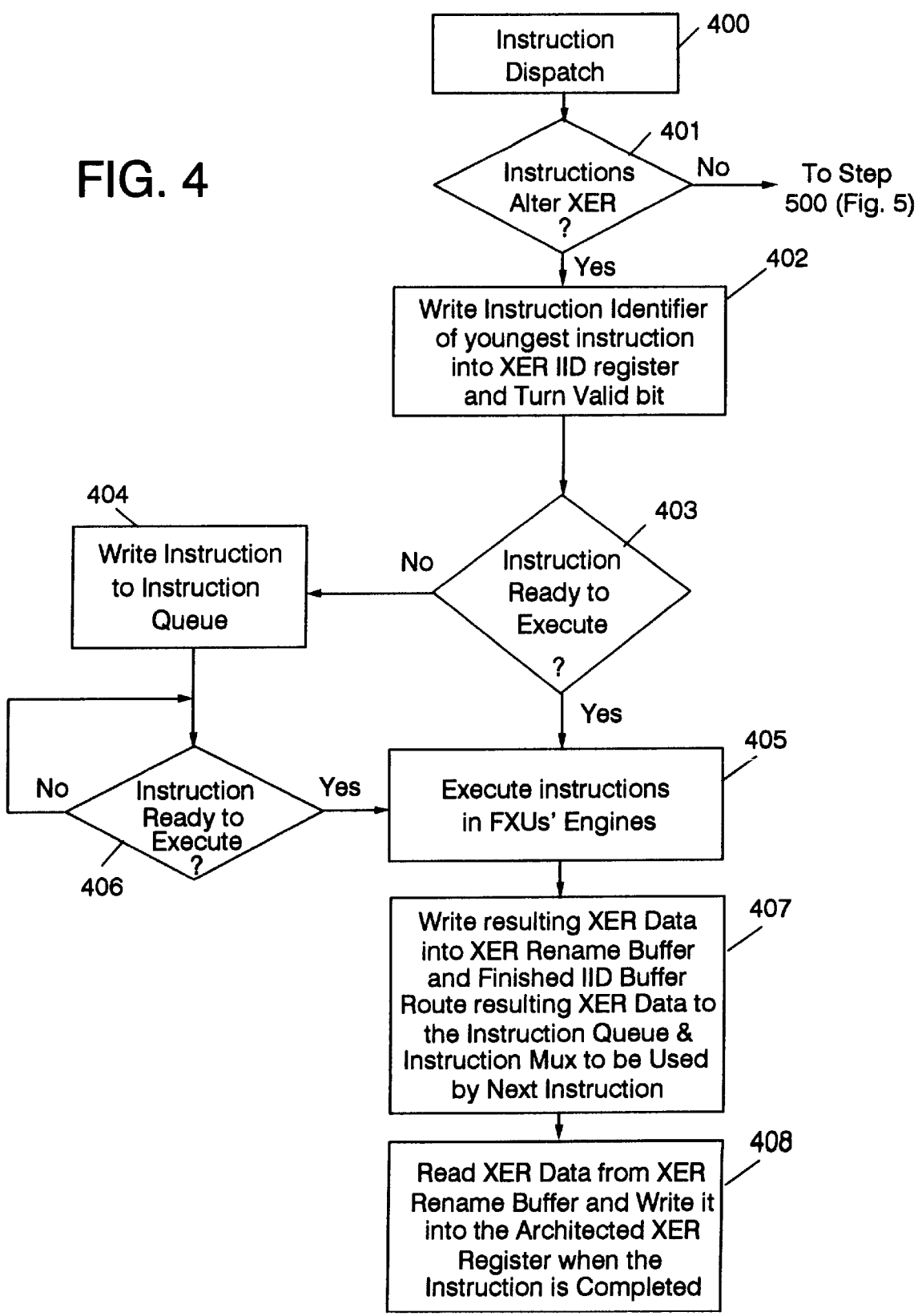
FIG. 4 illustrates, in flow chart form, a method of XER update execution in accordance with an embodiment of the present invention.

The operation of XER rename mechanism 300 may be better appreciated by now referring to FIG. 4. FIG. 4 depicts, in flow chart form, the operation of XER rename mechanism 300. If the instruction dispatched, in step 400, to fixed point unit 206 alters the XER, step 401, in step 402 its IID is written into XER IID 305 in XER status register 304. At the same time, valid flag 306 is turned on. If the instruction is not ready to execute, step 403, in step 404 the instruction is written to instruction queue 301. If, in step 403, the instruction is ready to execute, it is sent to fixed-point instruction engine 311, in step 405. In step 406, an instruction is held in instruction queue 301 until it is ready to execute. When an instruction is ready to execute, it is sent to the fixed-point execution engine 311 and executed in step 405. When the instruction finishes execution, in step 407, the resulting XER data is written into XER rename buffer 315 and the IID of the instruction is written into finished IID buffer 316. The XER data is, at the same time, written into XER data field 314 of the instruction in instruction queue 301 next ready to execute. However, instruction queue 301 may be empty, wherein the next instruction to execute may pass through to MUX 307. This instruction may use XER data, and this will be discussed below. When an instruction completes, in step 408, its XER data is read from XER rename buffer 315 and written into the architected XER 318.

An instruction that does not update XER data may nonetheless use XER data. Refer now to FIG. 5 in which is illustrated, in flow chart form, the operation of XER rename mechanism 300 for an instruction using XER data. In step 500, an instruction that neither updates nor uses XER data executes without implicating the XER rename process, in step 501. Otherwise, in step 502, the instruction reads XER rename register 304 to obtain the IID of the last preceding instruction to update XER data, and it also retrieves the value of validity bit 306. If, in step 503, the XER data is not in rename buffer 315, that is, validity bit 306 is off, then the XER data in the architected XER 316 is valid and the instruction does not retrieve XER data from rename buffer 315. The XER data is read from architected XER 317, in step 504. This may be effected by providing validity bit 306 to select logic 312.

If, however, validity bit 306 is set, in step 503, a CAM read is made in step 505. The CAM read is made into finish IID buffer 316, using the XER IID retrieved in step 502. If the IID is in finished IID buffer 316, then the relative address of that ID is used to access the corresponding XER data in XER rename buffer 315, in step 506. If, in step 505, the CAM read does not find the XER IID in finished IID buffer 316, the XER IID retrieved in step 502 is tested, in step 507, to determine if it is the IID of the instruction currently finishing. XER select logic 312 may implement this operation. If the XER IID retrieved in step 502 is the finished IID, then, in step 508, the XER data from fixed-point execution engine 311, through MUX 313, is used. If, in step 509, the instruction is ready to execute, the XER data is latched for use in the next execution cycle, step 510.

Otherwise in step 511, the instruction is written into instruction queue 301. If in step 512, the XER data is available from either steps 504, 506, or 508, in step 512, it is written into instruction queue 301 in field 314. Otherwise, in step 514, XER IID 303 in instruction queue 301 is compared with incoming finished IIDs using XER select logic 312. If a match is not obtained, then the process returns to step 512. If, however, in step 514, a match is obtained, and in step 515, the instruction depending on the finishing IID is ready to execute, then XER data is latched for use in the next execution cycle, in step 510. Then the instruction is executed in step 517. However, if in step 515, the instruction is not ready to execute, and the XER data has not been written to the instruction queue, in step 516, then the XER data is written to the instruction queue, in step 513. Otherwise, in step 516, the process returns to step 515, until the instruction is ready to execute, in step 515.

Although the present invention and its advantages have been described in detail, it should be understood that various changes, substitutions and alterations can be made herein without departing from the spirit and scope of the invention as defined by the appended claims.

What is claimed is:

1. In a data processor, a method of increasing instruction execution parallelism comprising the steps of:
   writing an instruction identifier into a first data storage device;
   writing one or more execution condition data values to a second data storage device when an instruction corresponding to said instruction identifier finishes execution, said second data storage device having one or more storage locations;
   setting one or more validity bits in said first data storage device; and
   obtaining said one or more execution condition data values using said instruction identifier and said one or more validity bits.

2. The method of claim 1 further comprising the step of, on completion of execution of said instruction, writing said data condition value to a third data storage device.

3. The method of claim 1 further comprising the step of writing said instruction identifier to a fourth data storage device, said fourth data storage device having one or more storage locations.

4. The method of claim 1 further comprising the step of routing said execution condition data value to an instruction queue and an data multiplexer.

5. The method of claim 3 wherein said step of obtaining said one or more execution condition data values using said instruction identifier further comprises the steps of:
   comparing said instruction identifier with each of a plurality of previously stored instruction identifiers in said fourth data storage device; and
   if a match occurs, indexing into said second data storage device using an index value obtained therefrom.

6. The method of claim 5 wherein said step of obtaining one or more execution condition data values further comprises the step of obtaining said one or more execution condition data values from an architected register in response to at least one validity bit data value in said first data storage device.

7. The method of claim 1 wherein said first data storage device is an integer exception register (XER) status register, said XER status register having a plurality of data storage fields.

8. The method of claim 1 wherein said second data storage device is an XER data buffer.

9. The method of claim 3 wherein said fourth data storage device is a finished instruction identifier (IID) buffer.

10. The method of claim 2 wherein said third data storage device is an integer exception register (XER).

11. The method of claim 1 wherein said step of writing an IID into a first data storage device, further comprises the steps of:
   when an instruction modifies integer exception register (XER) data values, writing an IID corresponding to said instruction into a first data storage field of an XER status register; and
   setting a validity data value in a second data storage field of said XER status register,
   wherein said step of writing one or more execution data values further comprises the steps of:
      after said instruction finishes execution, writing at least one XER data value to a storage location in an XER rename buffer; and
      writing said IID to a corresponding storage location in a finished IID buffer, and
   wherein said step of obtaining one or more execution condition data values further comprises the steps of:
      when an instruction uses one or more data values in said XER, obtaining an IID from said XER status register;
      obtaining said one or more data values from said XER if said validity data value in said XER status register is not set;

performing a content addressable memory read using said IID data from said XER status register and IID data in said finished IID buffer to access XER data values in said XER rename buffer; and using said IID data from said XER status register to snoop a finish bus from at least one fixed-point execution engine for one or more XER data values, if said IID data in said finished IID buffer does not correspond to said XER status register IID data.

12. A data processing apparatus for increasing instruction execution parallelism comprising:

a first data storage device, said first data storage device containing an instruction identifier (IID);

a second data storage device, said second data storage device containing one or more sets of execution condition data values;

circuitry coupled to said first and second data storage device for containing a set of execution condition data values using said IID and at least one validity bit, wherein said first data storage device further includes a portion containing said at least one validity bit.

13. The apparatus of claim 12 wherein said circuitry coupled to said first and second data storage devices further comprises a third data storage device, said third data storage device receiving said IID after an instruction corresponding to said IID finishes execution.

14. The apparatus of claim 12 wherein said circuitry coupled to said first and second data storage devices further comprises at least one instruction queue coupled to said first data storage device, said instruction queue having one or more entries, each entry including a first portion for receiving instruction data and a second portion for receiving an IID corresponding to an instruction modifying one or more members of a set of execution condition data values.

15. The apparatus of claim 12 wherein said circuitry coupled to said first and second data storage devices further comprises circuitry for selecting an IID corresponding to an instruction modifying one or more members of a set of execution condition values.

16. The apparatus of claim 15 wherein said circuitry for selecting an IID is a multiplexer (MUX).

17. The apparatus of claim 12 wherein said circuitry for obtaining a set of execution condition data values further comprises circuitry for selecting a set of execution condition data values from a plurality of sets of execution condition data values.

18. The apparatus of claim 17 wherein said circuitry for selecting a set of execution condition data values further comprises:

at least one selection logic circuit receiving a plurality of IIDs and one or more validity bits, wherein a first IID of said plurality is from said first data storage device, and a second IID of said plurality is from an execution device; and at least one multiplexer coupled to an output of said at least one selection logic circuit and to said second data storage device, said multiplexer receiving said plurality of sets of execution condition data values for selection in response to data on said output of said at least one selection logic circuit.

19. The apparatus of claim 12 wherein said circuitry coupled to said first and second data storage devices includes at least one execution device, said at least one execution device having an output coupled to said second data storage device.

20. The apparatus of claim 13 wherein said circuitry for obtaining a set of execution condition data values further comprises content addressable memory logic coupled to said second and third data storage devices, an address for accessing said second data storage buffer obtained by reference to contents of said third data storage device.

21. The apparatus of claim 12 wherein said first data storage device is an integer exception register (XER) status register.

22. The apparatus of claim 12 wherein said second data storage device is an XER rename buffer.

23. The apparatus of claim 13 wherein said third data storage device is a finished IID buffer.

24. The apparatus of claim 12 wherein said execution condition data values are XER data values.

25. The apparatus of claim 12 wherein said first data storage device further comprises:

an integer exception register (XER) status register, said XER status register including at least three fields, a first field containing an XER instruction identifier (IID), a second field containing a validity data value, and a third field containing XER data, wherein said second data storage device further comprises an XER rename buffer including at least one storage location, each of said storage locations containing a plurality of XER data values, and wherein said circuitry coupled to said first and second data storage devices further comprises:

a finished IID buffer including at least one storage location containing an IID of an instruction that has finished execution, each storage location corresponding to a storage location of said XER rename buffer;

content addressable memory (CAM) logic coupled to said XER status register, said finished IID buffer, and said XER rename buffer, said CAM logic addressing into said XER rename buffer using an XER IID in said XER status register;

an instruction queue coupled to said XER status register, said instruction queue having an instruction data field, an XER IID field for receiving an XER IID corresponding to an XER IID in said XER status register, and a third field containing XER data;

first and second multiplexers (MUX), said first multiplexer receiving instruction data form said instruction queue and an instruction dispatcher, and said second multiplexer receiving XER IID data from said instruction queue and said instruction dispatcher;

instruction select logic coupled to said first and second MUXs for controlling said MUXs, said instruction select logic further coupled to said instruction queue wherein said MUXs are controlled in response to an empty instruction queue;

XER select logic coupled to an output of said second MUX for receiving an XER IID value;

a third MUX coupled to an output of said XER select logic, said third MUX being controlled thereby, and said third mux receiving XER data from said XER rename buffer and said XER data field in said instruction queue;

at least one fixed-point engine outputting finished IID data to said finished IID buffer and XER data to said XER rename buffer, said XER rename buffer and said third MUX, said finished IID data being input to said XER select logic;

an architected XER receiving XER data from said XER rename buffer, said XER outputting data to said third MUX; and an XER data register having an input coupled to an output of said third MUX and an output coupled to an input of said at least one fixed-point execution engine, said XER data register latching XER data received from said third MUX for use by an instruction executing in said fixed-point execution engine.

26. A data processing system comprising:
an input means for communicating a plurality of instructions;
an condition logic circuit for generating one or more sets of execution condition values in response to one or more of said plurality of instructions;
rename logic circuitry coupled to said condition logic circuit, said rename logic circuitry further including:
a first data storage device for containing said one or more sets of execution condition values; and
an exception register status register coupled to said input means, said status register containing an instruction identifier (IID) corresponding to one of said plurality of instructions; and
an exception register coupled to said rename logic circuitry, said exception register receiving a one of said one or more sets of execution condition values.

27. The data processing system of claim 26 wherein said condition logic circuit includes an execution engine.

28. The data processing system of claim 26 wherein said rename logic circuitry further comprises an instruction queue containing a subset of said plurality of instructions, said instruction queue being coupled to said condition logic circuit, and communicating instructions thereto.

29. The data processing system of claim 26 wherein said condition logic circuit further comprises circuitry for receiving a first one of said one or more sets of execution condition values and generating a second one of said one or more sets of execution condition values in response thereto.

30. The data processing system of claim 26 wherein said rename logic circuit further comprises a second data storage device, said second device containing one or more IIDs associated with one or more finished instructions, each instruction generating a corresponding execution condition value set in said first data storage device.

31. The data processing system of claim 26 wherein said rename logic circuit further comprises circuitry for selecting a set of execution condition values from said first data storage device.

32. The data processing system of claim 31 wherein said circuitry for selecting a set of execution condition values from said first data storage device comprises content addressable memory logic coupled to said first and second data storage devices.

33. The data processing system of claim 26 wherein said rename logic circuitry further includes circuitry for selecting a set of execution condition values from a first set of execution condition values in said first data device and a second set of execution condition values generated by said condition logic.

34. The data processing system of claim 26 wherein said exception register is an architected integer exception register (XER).

35. The data processing system of claim 26 wherein said condition logic further comprises at least one fixed-point execution engine.

36. The data processing system of claim 26 wherein said exception register status register is an XER status register, and said first data storage device is an XER rename buffer.

37. The data processing system of claim 26 wherein said input means for communicating a plurality of instructions is an instruction dispatcher.

38. The data processing system of claim 37 wherein said exception register status register is an XER status register having a first field containing an XER IID, a second field containing a validity data value, and a third field containing XER data, wherein said first data storage device is an XER rename buffer including at least one storage location, each of said storage locations containing a plurality of XER data values, wherein said condition logic circuit further comprises at least one fixed-point execution engine, wherein said exception register is an XER, and wherein said rename logic circuitry further comprises:
a finished IID buffer including at least one storage location containing an IID of an instruction that has finished execution, each storage location corresponding to a storage location of said XER rename buffer;
content addressable memory (CAM) logic coupled to said XER status register, said finished IID buffer, and said XER rename buffer, said CAM logic addressing into said XER rename buffer using an XER IID in said XER status register;
an instruction queue coupled to said XER status register, said instruction queue having an instruction data field, an XER IID field for receiving an XER IID corresponding to an XER IID in said XER status register, and a third field containing XER data;
first and second multiplexers (MUX), said first multiplexer receiving instruction data form said instruction queue and an instruction dispatcher, and said second multiplexer receiving XER IID data from said instruction queue and said instruction dispatcher;
instruction select logic coupled to said first and second MUXs for controlling said MUXs, said instruction select logic further coupled to said instruction queue wherein said MUXs are controlled in response to an empty instruction queue;
XER select logic coupled to an output of said second MUX for receiving an XER IID value;
a third MUX coupled to an output of said XER select logic, said third MUX being controlled thereby, and said third mux receiving XER data from said XER rename buffer and said XER data field in said instruction queue; and
an XER data register having an input coupled to an output of said third MUX and an output coupled to an input of said at least one fixed-point execution engine, said XER data register latching XER data received from said third MUX for use by an instruction executing in said fixed-point execution engine, wherein said fixed-point engine outputs finished IID data to said finished IID buffer and XER data to said XER rename buffer, said XER rename buffer and said third MUX, said finished IID data being input to said XER select logic, and wherein said XER receives XER data from said XER rename buffer, said XER outputting data to said third MUX.

* * * * *